F. R. HEWITT.
LOG MOVING MACHINE.
APPLICATION FILED DEC. 12, 1916.
1,220,122. Patented Mar. 20, 1917.
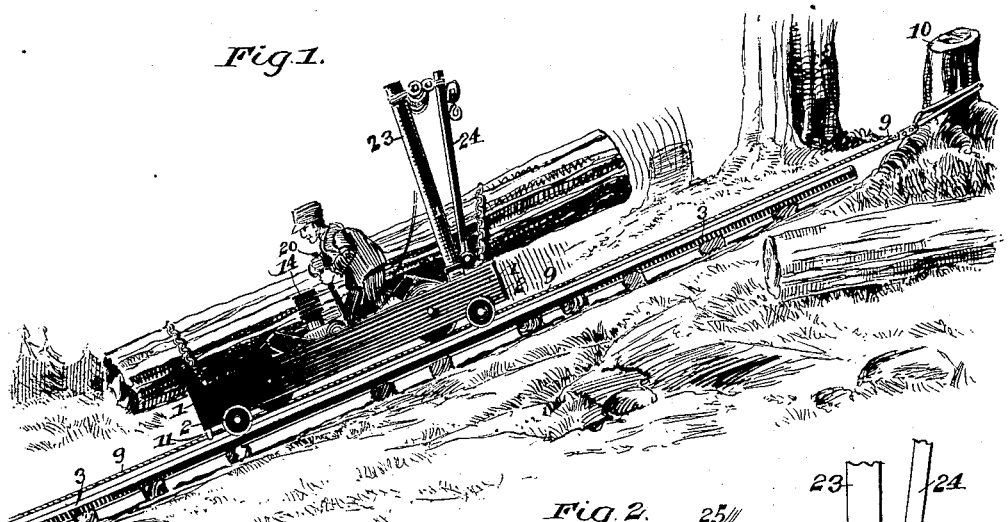
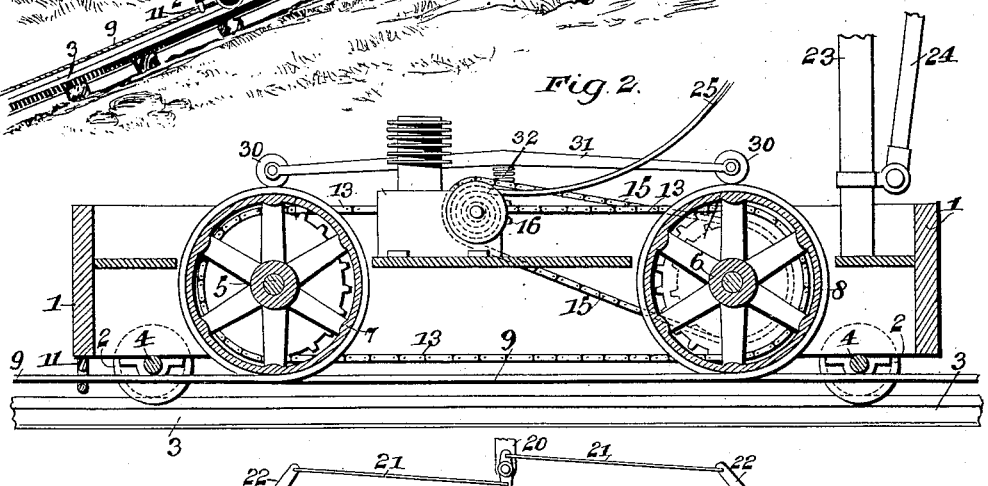
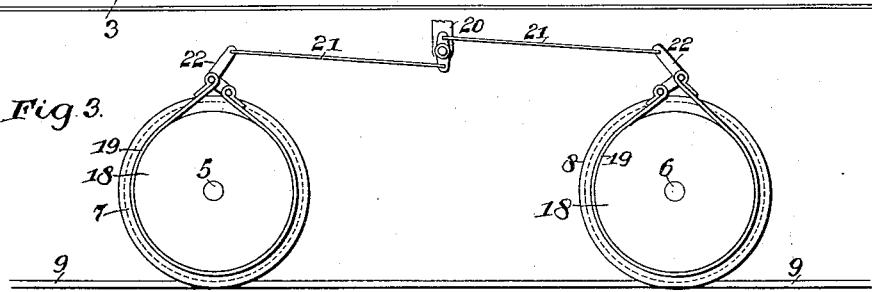
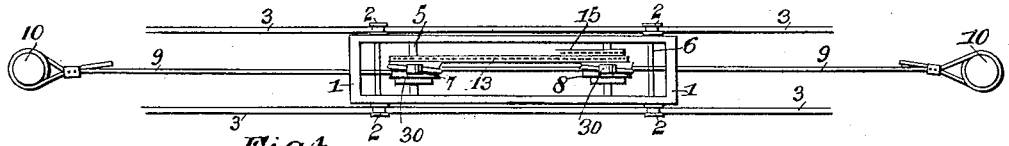
WITNESSES
John D. Schrott
H. E. Beck
INVENTOR
Frank R. Hewitt
BY
Munn & Co.
ATTORNEYS

UNITED STATES PATENT OFFICE.

FRANK R. HEWITT, OF HEWITT, NORTH CAROLINA.

LOG-MOVING MACHINE.

1,220,122.  Specification of Letters Patent.  Patented Mar. 20, 1917.

Application filed December 12, 1916. Serial No. 136,467.

*To all whom it may concern:*

Be it known that I, FRANK R. HEWITT, a citizen of the United States, and a resident of Hewitt, in the county of Swain and State of North Carolina, have invented an Improvement in Log-Moving Machines, of which the following is a specification.

My invention is an improvement in means for moving logs, and has for its object to provide a machine of the character specified, for getting out logs from places inaccessible to the ordinary moving means for the logs, wherein a carriage is provided for hauling the logs, the said carriage running upon a track, and having reels upon which a flexible member as, for instance, a rope or the like, winds, wherein the reels are driven to wind up and unwind the rope to move the tractor in opposite directions.

In the drawings:

Figure 1 is a perspective view showing the improved machine in use.

Fig. 2 is a longitudinal vertical section.

Fig. 3 is a side view of the reel showing the breaking mechanism.

Fig. 4 is a diagrammatic top plan view.

In the present embodiment of the invention a tractor is provided, consisting of a body 1 having mounted thereupon wheels 2, which run upon a track 3, the said track consisting of the usual rails. The wheels are mounted upon axles 4 supported by the body, and within the body and near the ends thereof shafts 5 and 6 are arranged, each of said shafts supporting a reel 7 and 8, respectively.

A flexible member is provided, the said member being, in the present instance, a rope or cable 9, which is anchored at its ends as indicated at 10, by means of fixed objects, as, for instance, stumps, and this flexible member intermediate its ends winds upon the reels 7 and 8. It will be noticed that the peripheries of these reels extend below the frame, so that the rope may pass freely past the frame, and at one end the carriage has a guide eye 11 for the flexible member. Each reel has rigid therewith a sprocket gear 12, and these gears are connected by a sprocket chain 13, for constraining the reels to rotate together. The reel 8 is driven from a motor 14 of any usual or desired construction, as for instance, an internal combustion engine which is connected to the reel 8 by means of a sprocket chain 15, which engages sprocket wheels 16 and 17, respectively, on the motor shaft and on the shaft 6.

Brake mechanism is provided in connection with the reels, the said mechanism consisting of brake drums 18 rigid with the reels, each drum being encircled by a brake band 19. These bands are simultaneously operated by a lever 20, arranged between the reels and pivoted to the frame, and connected by links 21 above and below its pivotal connection to elbow levers 22, which in turn are connected with the brake bands to operate the same. When the lever is swung in one direction both bands are simultaneously relaxed, while when the lever is swung in the opposite direction both bands are simultaneously tightened.

A derrick is supported by the carriage, the said derrick comprising a mast 23 and a boom 24 pivoted thereto, and connected to the mast by the usual block and tackle. The hoisting cable 25 passes to a drum 26 arranged upon the motor shaft and the drum is so arranged that it may be coupled to or uncoupled from either drum or sprocket wheel 16. By means of the derrick the logs may be loaded, and they may be drawn from a distance to the carriage. After they have been loaded the derrick is disconnected and the motor will drive the carriage in either direction, by continuously winding in and unwinding the cables. In descending grades the brake may be used to control the speed of the vehicle.

It will be noticed from an inspection of Fig. 2 that friction rollers 30 are provided for assisting the cable to grip the reels. These friction rollers rest upon the cable, being journaled in the end of the bar 31, which is spring supported as indicated at 32. It will be understood that the logs, in practice, are not carried on the vehicle, but on cars which are connected with the carriage, although it is obvious that they might be carried on the vehicle.

I claim:

1. A device of the character specified, comprising a trackway, a wheeled carriage running on the trackway, reels supported by the carriage near the ends thereof, a flexible member anchored at its ends and extending along the trackway and winding on the reels intermediate its ends, means for driving the reels, a brake disk in connection with each reel, a brake ring encircling each disk, and a common means for simultaneously operating the rings, said driving means comprising a motor connected to one of the reels, a connection between the reels for constraining them to rotate together, a friction roller engaging the flexible member on each reel at the top of the reel, an arm extending between the reels on which the friction wheels are journaled, and a spring normally pressing said arm toward the wheels.

2. A device of the character specified comprising a trackway, a wheeled carriage running on the trackway, reels journaled on the carriage near the ends thereof, a flexible member anchored at its ends and extending along the trackway and winding on the reels, a positive driving connection between the reels, a friction wheel spring pressed toward each reel and engaging the flexible member thereon.

FRANK R. HEWITT.

Witnesses:
FRANK E. FRY,
O. P. McGRAW.

Copies of this patent may be obtained for five cents each, by addressing the "Commissioner of Patents, Washington, D. C."